(12) United States Patent
Ah-fa et al.

(10) Patent No.: US 6,185,926 B1
(45) Date of Patent: Feb. 13, 2001

(54) TURBOJET ENGINE THRUST REVERSER AND EXHAUST NOZZLE ASSEMBLY

(75) Inventors: Michel David Ah-fa, Paris; Xavier Jean-Michel André Guyonnet, Fontainebleau; Gérard Ernest André Jourdain, Saintry, all of (FR)

(73) Assignee: SNECMA Moteurs (FR)

( * ) Notice: Under 35 U.S.C. 154(b), the term of this patent shall be extended for 0 days.

(21) Appl. No.: 09/497,178

(22) Filed: Feb. 3, 2000

(30) Foreign Application Priority Data

Feb. 4, 1999 (FR) .................................................. 99 01255

(51) Int. Cl.$^7$ ........................................................ F02K 1/60
(52) U.S. Cl. ..................................... 60/226.2; 239/265.37
(58) Field of Search ................................... 60/226.2, 230; 239/265.33, 265.37, 265.39, 265.41; 244/110.13

(56) References Cited

U.S. PATENT DOCUMENTS

| | | | |
|---|---|---|---|
| 2,735,264 | * 2/1956 | Jewett | ............................. 239/265.37 |
| 3,734,411 | 5/1973 | Wolf et al. . | |
| 3,856,239 | * 12/1974 | Leibach | ............................... 60/226.2 |
| 4,052,007 | 10/1977 | Willard . | |
| 4,129,269 | * 12/1978 | Fage | ..................................... 60/226.2 |
| 4,392,615 | 7/1983 | Madden . | |
| 4,641,782 | 2/1987 | Woodward . | |
| 5,050,803 | 9/1991 | Wakeman et al. . | |
| 5,097,661 | * 3/1992 | Lain et al. | ........................... 60/226.2 |
| 5,794,433 | * 8/1998 | Peters et al. | .......................... 60/226.2 |

FOREIGN PATENT DOCUMENTS 2602274   2/1988 (FR) .

* cited by examiner

Primary Examiner—Louis J. Casaregola
(74) Attorney, Agent, or Firm—Bacon & Thomas, PLLC

(57) ABSTRACT

An exhaust assembly for a jet powerplant of a supersonic airplane comprising a rear structure fitted with a thrust reverser. The rear structure includes a primary multi-flap nozzle of variable cross-section situated downstream of a primary duct, a secondary multi-flap nozzle of variable cross-section situated downstream of a secondary duct enclosing the primary duct and a fairing enclosing the secondary duct and fitted with a throat downstream of an exhaust orifice of the secondary nozzle, the throat being followed by a diverging portion. The thrust reverser comprises two eyelids affixed in a pivotable manner to the fairing, one on each side to of an axial plane of symmetry. The eyelids are movable between an active, thrust-reversal position wherein the eyelids project transversely into a gas jet downstream of the fairing to deflect the gas jet in a forward direction for thrust-reversal and an inactive, forward-thrust position wherein the eyelids are situated in an extension of the fairing. The two eyelids are each mounted on the fairing by two lateral linkrods which are freely pivotable relative to the fairing about a transverse axis in the vicinity of the axial plane of symmetry. The eyelids furthermore are retained on the fairing by two outer actuators and by two inner actuators. Only the latter will be driven in the forward-thrust mode. The external linear actuators are driven when passing into the thrust-reversal mode.

8 Claims, 8 Drawing Sheets

US 6,185,926 B1

TURBOJET ENGINE THRUST REVERSER AND EXHAUST NOZZLE ASSEMBLY

BACKGROUND OF THE INVENTION

1. Field of the Invention

The present invention relates to a thrust-reversing rear exhaust structure of a turbojet engine, especially a twin-structure, variable-cycle bypass engine to propel a civilian supersonic airplane.

2. Description of the Related Art

In gas-jet exhaust assemblies as that of the present invention, a primary nozzle of variable cross-section is fitted with several flaps and situated downstream of a primary duct. A primary gas flow is exhausted from the primary nozzle during operation of the engine. A secondary nozzle of variable cross-section is also fitted with several flaps and situated downstream of a secondary duct enclosing the primary duct. The secondary duct extends rearward beyond the exhaust orifice of the primary duct. A secondary gas flow is exhausted from the secondary nozzle during operation of the engine.

A fairing encloses the secondary duct. The fairing is fitted with a throat, the so-called pickup throat, downstream of the exhaust orifice of the secondary nozzle. The throat is followed by a diverging portion.

A thrust reverser is provided comprising two identical eyelids which are pivotable on the fairing on either side of an axial plane of symmetry. The eyelids are able to assume either an active position, namely thrust-reversal, wherein they transversely project into the gas jet downstream of the fairing in order to deflect the gas jet forwardly, or an inactive position, namely forward-thrust, wherein they are situated in the extension of the fairing.

The assemblies also include means for driving the flaps of the primary and secondary nozzles and means for driving the eyelids.

Such an exhaust assembly uses the thrust-reverser eyelids in a manner known per se and which is utilized in the civilian Concorde plane. The eyelids are each pivotably mounted about a transverse axis near an axial plane of symmetry to allow control of the engine's exhaust cross-section as a function of flight modes. The width of the slit separating the upstream end of each eyelid from the downstream end of the fairing is a function of the pivot angle of the eyelids, the angle varying with the flight modes. An air flow issuing from the end of the fairing enters this slit and mixes with the gas flows.

SUMMARY OF THE INVENTION

The objective of the present invention is to create a novel eyelid kinematics which allows optimizing operation in supersonic cruise and other flight modes.

The objective of the invention is attained by an exhaust assembly in which each of two eyelids are mounted to the fairing by two lateral linkrods which are freely pivotable relative to the fairing about a transverse axis situated near the axial plane of symmetry. The eyelids are retained by at least one inner actuator anchored on the fairing and connected to a point on the respective eyelid relatively near the axial plane of symmetry. Each linkrod is retained by at least one outer actuator anchored on the fairing and connected to a point on the respective eyelid relatively further away from the axial plane of symmetry. The outer and inner actuators comprise a driving mechanism for the two eyelids.

Advantageously, actuating the inner actuators allows one to attain the required configurations for a forward-thrust mode and actuating the outer actuators allows one to attain the required configurations for a thrust-reversal mode.

When operating in the forward-thrust mode, the length of the external linear actuators is held substantially constant so as to act as additional linkrods. In such case, the eyelids have only one degree of freedom.

Preferably, each eyelid is retained by two synchronized inner actuators and by two synchronized outer actuators which are arranged on each side of an axial plane of symmetry of the respective eyelid.

The fairing preferably subtends a surface of revolution around a longitudinal axis of the primary duct.

In another feature of the invention, the primary nozzle comprises a plurality of controlled hot flaps alternating with a plurality of follower hot-flaps and the secondary nozzle comprises a plurality of driven cold flaps alternating with a plurality of follower cold-flaps.

A drive system for the hot and cold flaps comprises an axially displaceable drive ring situated around the cold flaps, a plurality of levers and a plurality of linkrods. The levers each have a first end, a second end and a middle portion. The first end hinges on the control ring and the middle portion hinges on the driven cold flaps. The linkrods connect the controlled hot flaps to the second ends of the levers.

BRIEF DESCRIPTION OF THE DRAWINGS

Other features and advantages of the invention are elucidated in the following illustrative description, with reference to the attached drawings, in which.

DETAILED DESCRIPTION OF THE PREFERRED EMBODIMENT

Figure 1:
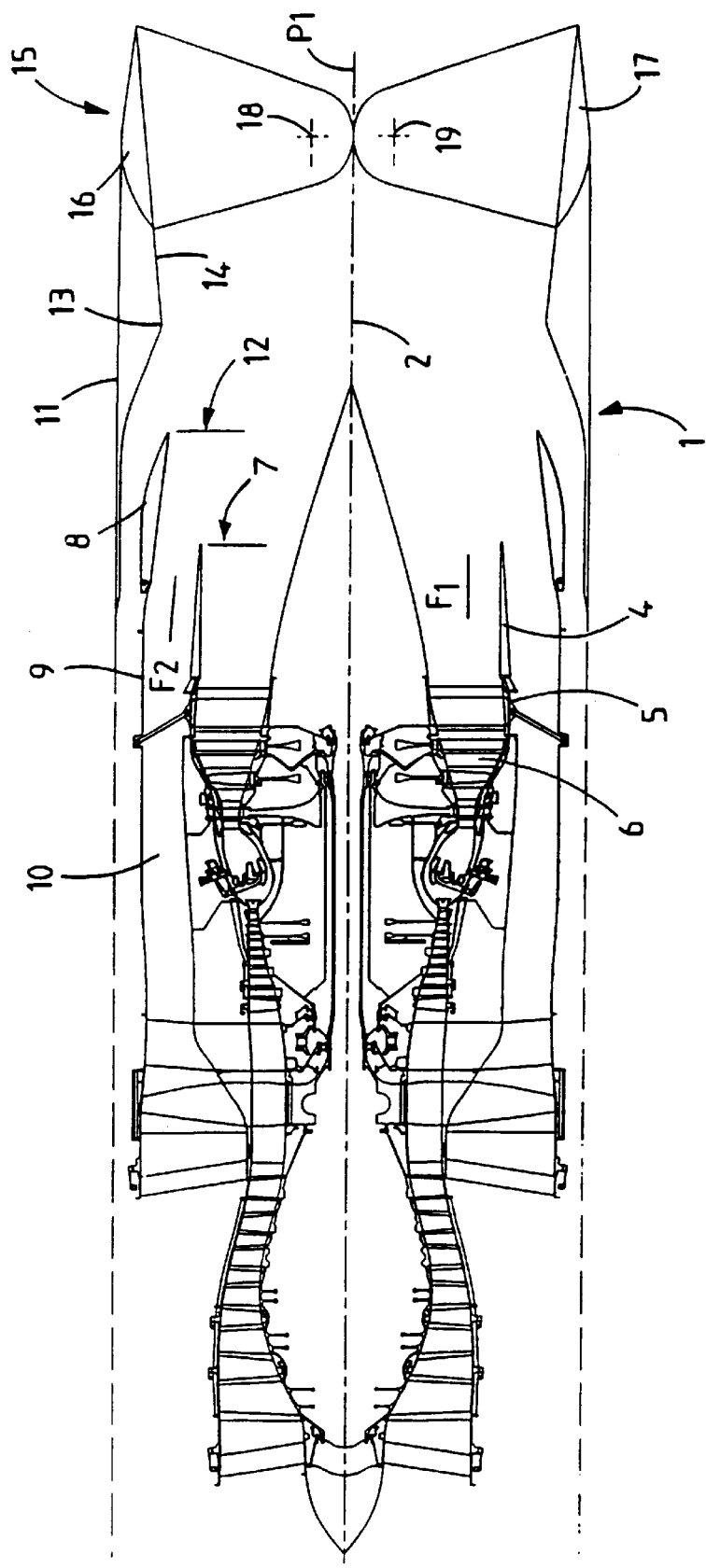
FIG. 1 is a cross-section view of a turbojet engine to which the invention may be applied.

FIG. 1 shows a turbojet engine to which the invention may be applied. The rear structure 1 of the turbojet engine has a longitudinal axis 2. Th rear structure comprises a primary nozzle fitted with hot flaps 4 hinging on a downstream end of a primary duct 5. A flow F1 of hot gases issuing from a plurality of turbines 6 circulates is exhausted from the primary nozzle through a primary exhaust orifice 7. The rear structure further comprises a secondary nozzle fitted with cold flaps 8 hinging on a downstream end of a secondary duct 9 enclosing the primary duct 5. The primary duct 5 and the secondary duct 9 together bound an annular passage 10 for a fresh-air flow F2. The rear structure also comprises a fairing 11 enclosing the secondary nozzle. The fairing 11 preferably subtends a surface a revolution about the axis 2 of the primary duct 5. The fairing is fitted downstream of a secondary exhaust orifice 12 with a throat 13, the so-called pickup throat. The throat 13 is followed by a divergent portion 14 of the fairing 11. A third nozzle 15 is located immediately downstream of the fairing 1 1. The third nozzle 15 comprises two eyelids 16 and 17 situated on either side of an axial plane of symmetry P1 passing though the axis 2 of the turbojet engine and perpendicular to the cross-sectional plane of FIG. 1. The eyelids 16 and 17 are each pivotable about fixed, transverse axes 18 and 19, respectively, which are parallel to the plane P1.

Figure 2:
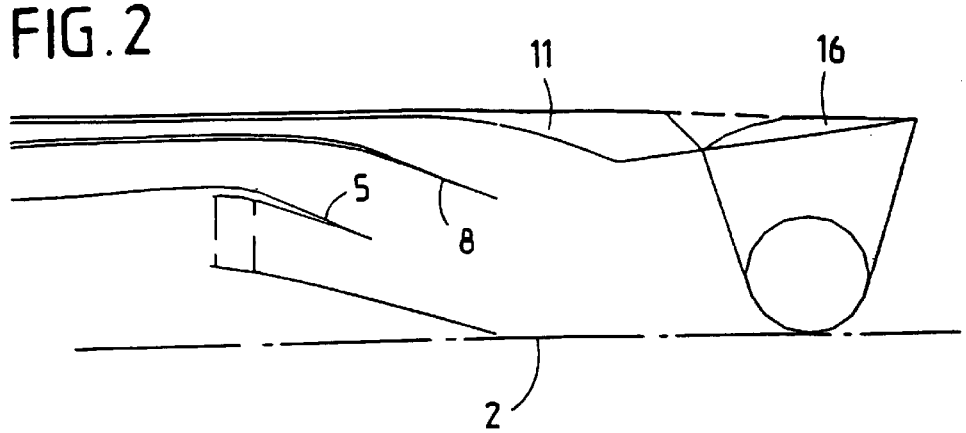
FIGS. 2–6 are cross-section views showing the angular positions of the various flaps in different flight modes, FIG. 2 showing the supersonic cruise mode, FIG. 3 showing the transsonic mode, FIG. 4 showing the subsonic, FIG. 5 showing the takeoff mode, and FIG. 6 showing the landing mode.
Figure 3:
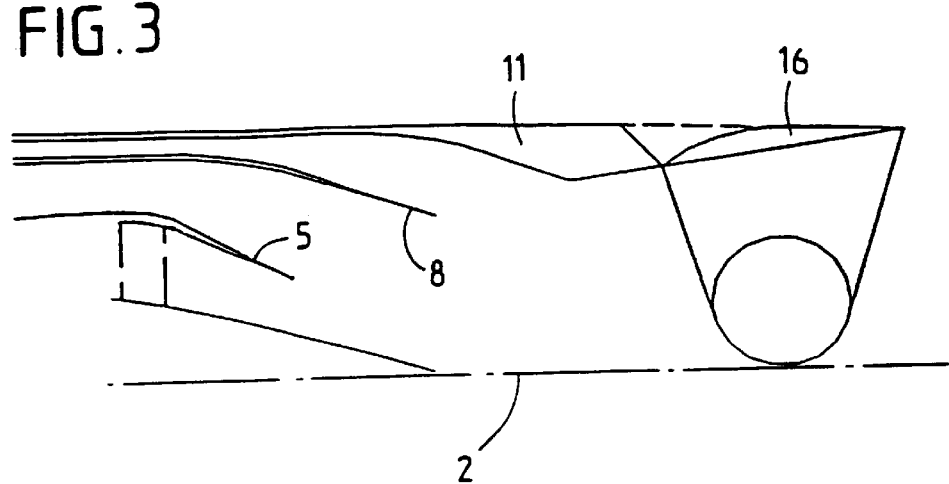
Figure 4:
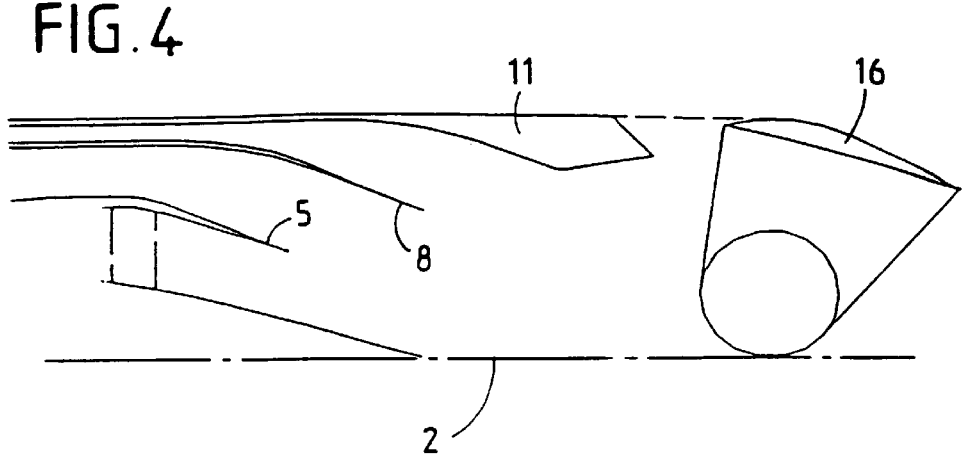
Figure 5:
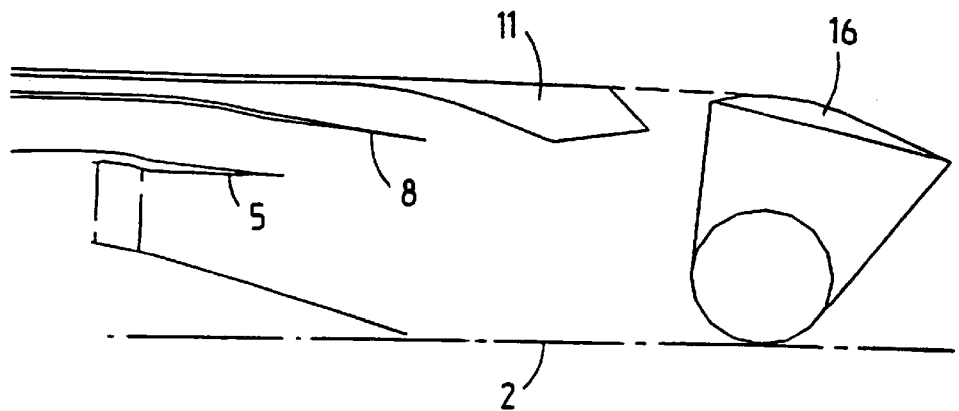
Figure 6:
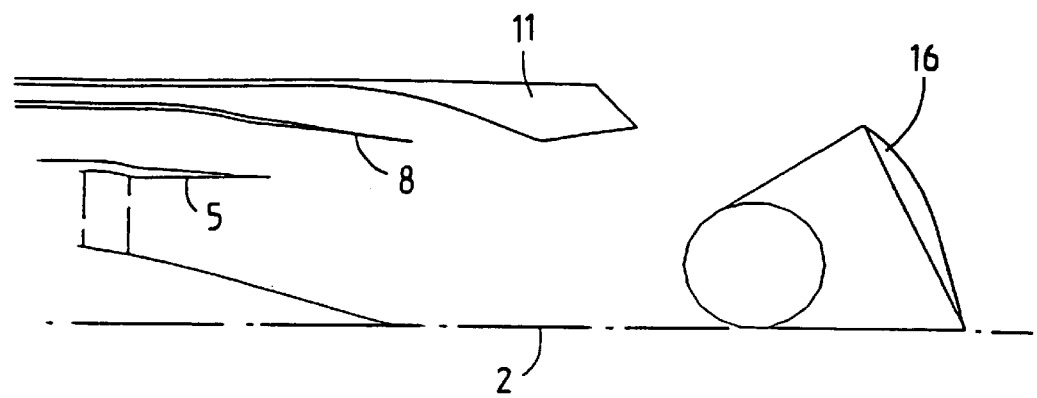

FIGS. 2 through 6 show the angular positions of the hot flaps 4, the cold flaps 8 and the eyelids 16, 17 as a function of different flight modes: FIG. 2 showing the configuration in the supersonic cruise mode at a speed M=2; FIG. 3 showing the configuration of the various flaps in the trans-sonic mode at M=1.2; FIG. 4 showing the configuration in the subsonic mode at M=0.95; FIG. 5 showing the configuration in the takeoff mode at M=0.3; and, FIG. 6 showing the eyelid positions when landing, when the eyelids project into the gas jet and reverse the combustion gases to redirect them to the fore of the turbojet engine.

Figure 7:
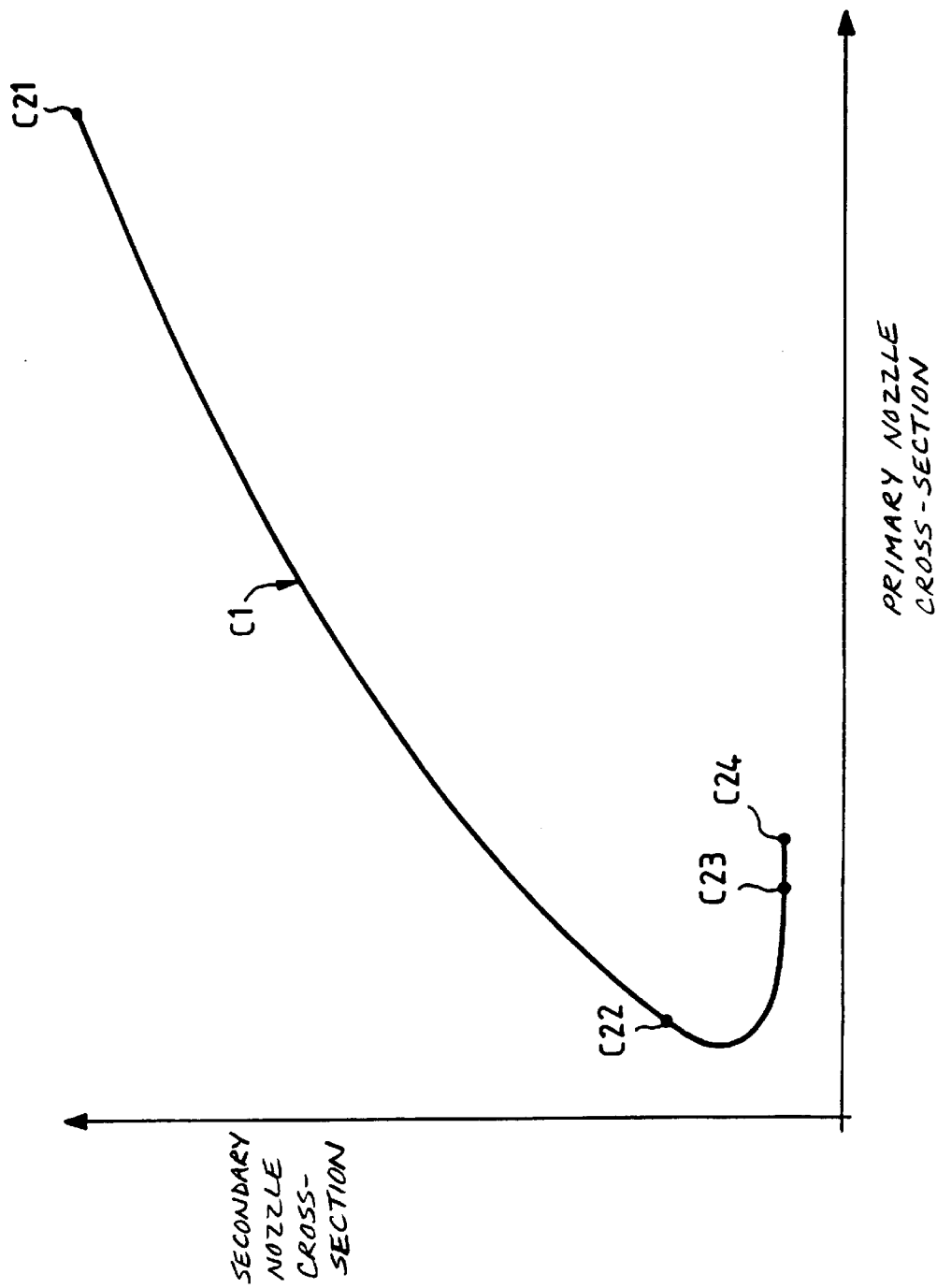
FIG. 7 is a graph showing the cross-section of the secondary nozzle as a function of the cross-section of the primary nozzle.

FIG. 7 is a plot of C1 representing the variation in secondary-duct cross-section as a function of the primary-duct cross-section, the points C21, C22, C23, C24 of the curve C1 corresponding to the takeoff mode, the trans-sonic mode(M=1.2), the supersonic cruise mode (M=2) and the sub-sonic cruise mode (M=0.95), respectively.

The hot flaps 4 of the primary nozzle and the cold flaps 8 of the secondary nozzle in known manner comprise a plurality of driven flaps alternating with a plurality of follower flaps. The driven hot flaps 4 and the driven cold flaps 6 are driven jointly from a single drive system 30 implementing the function C1 (the primary-nozzle cross-section vs the secondary-nozzle cross-section plot of FIG. 7).

Figure 8:
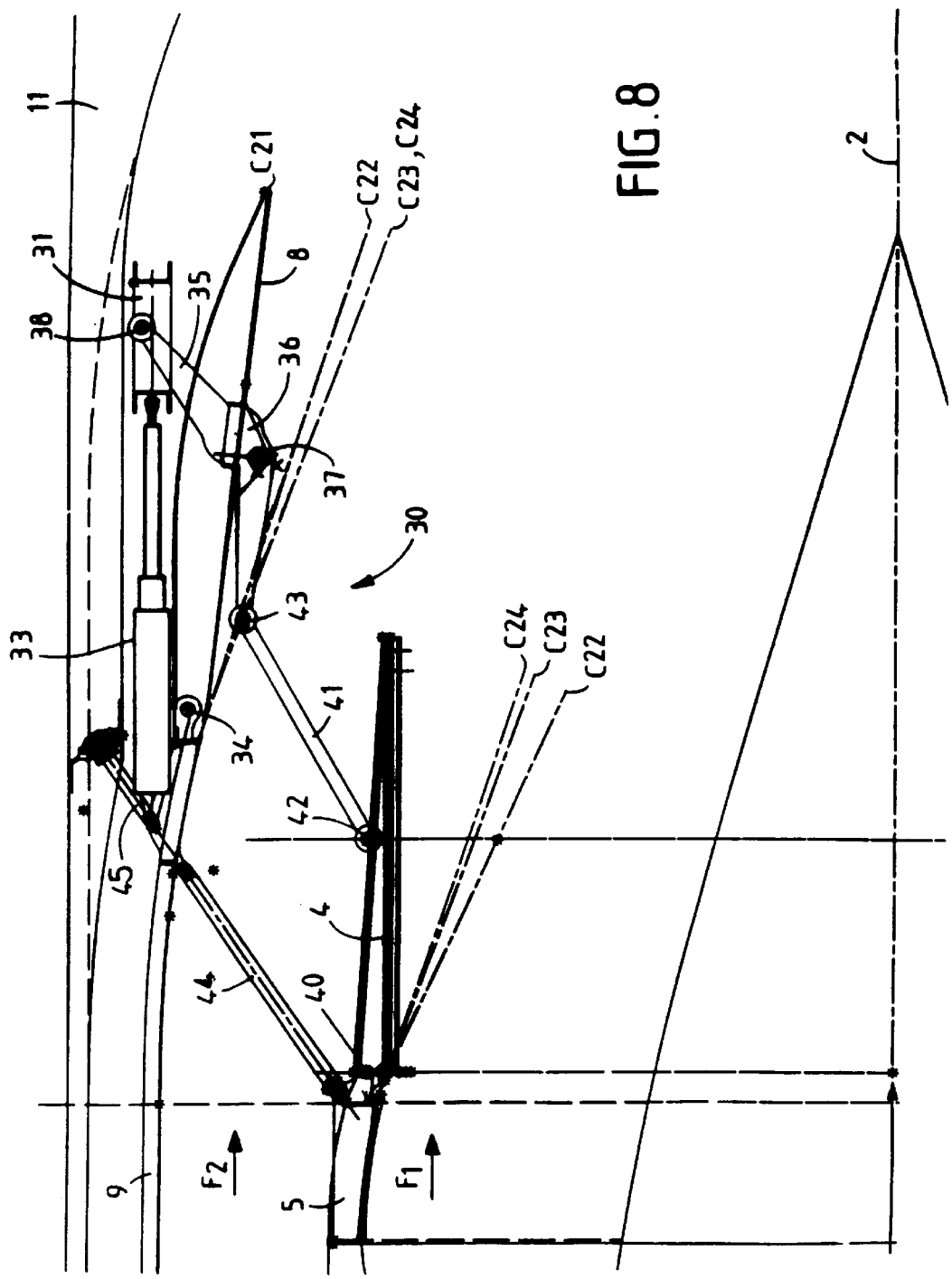
FIG. 8 is a cross-section view showing a detailed control system of the primary and secondary nozzles.

The drive system 30 is shown in FIG. 8 and comprises a control ring 31 situated around the axis 2 and between the cold flaps 8 and the fairing 11. The control ring 31 is displaceable parallel to the axis 2 by a plurality of synchronized telescoping actuators 33 anchored on the secondary duct 9. Each driven cold flap 8 hinges on the secondary duct 9 in such a way as to be pivotable about a cold flap hinge shaft 34 by an outer arm 35 of a lever 36. The lever 36 has a middle portion hinging on the cold flap 8 so as to be pivotable about a lever shaft 37 parallel to the cold flap hinge shaft 34. The end of the arm 35 hinges on the control ring 31 by a ring shaft 38 parallel to the clod flap hinge shaft 34.

Each driven hot flap 4 hinges on the primary duct 5 so as to be pivotable about a hot flap hinge shaft 40 parallel to the clod flap hinge shaft 34 of the corresponding driven cold flap 8 on the secondary duct 9. At least one control linkrod 41, of which one end hinges at a point 42 on the hot flap 4 and of which the other end hinges at a point 43 on an inner end of the lever 36, permits the angular position of each hot flap 4 to be constrained as a function of the angular position of the corresponding cold flap 8. The dimensions, positions and shapes of the levers 36 and the control linkrods 41 are selected so that the flaps are controlled in accordance with the function C1 of the primary and secondary nozzles as defined in FIG. 7.

Operationally, the telescoping linear actuators 33 cause the control ring 31 to move parallel to the turbojet-engine axis 2. This displacement in turn causes the driven cold flaps 8 and the cold follower flaps to pivot about the cold flap hinge shafts 34 by the rotation of the external arms 35 of the levers 36. This very displacement of the control ring 31 and the pivoting motion of the levers 36 about the lever shafts 37 entail synchronized motion of the control linkrods 41 and consequently rotation of the driven hot flaps 4 and the hot follower flaps about the hot flap hinge shafts 40.

The references C21, C22, C23, C24 of FIG. 8 correspond to the angular positions of the hot flaps 4 and cold flaps 8 in the takeoff mode, the trans-sonic mode (M=1.2), the supersonic cruise mode (M=2) and the sub-sonic mode (M=0.95), respectively. In the transition from C22 to C23 in FIG. 7, the flaps 8 continue their closing motion while the flaps 4 open farther as shown by FIG. 8. At an intermediate position in the transition, the points 42 and 43 and the lever shaft 37 are aligned.

Connecting linkrods 44 connect the downstream end of the primary duct 5 to the downstream end of the secondary duct 9. The downstream end of the secondary duct 9 furthermore is connected by auxiliary linkrods 45 to the fairing 11. The connecting linkrods 44 and the auxiliary linkrods 45 brace the support structures of the hinge shafts 40 and 34 of the hot flaps 4 and the cold flaps 9.

Figure 9:
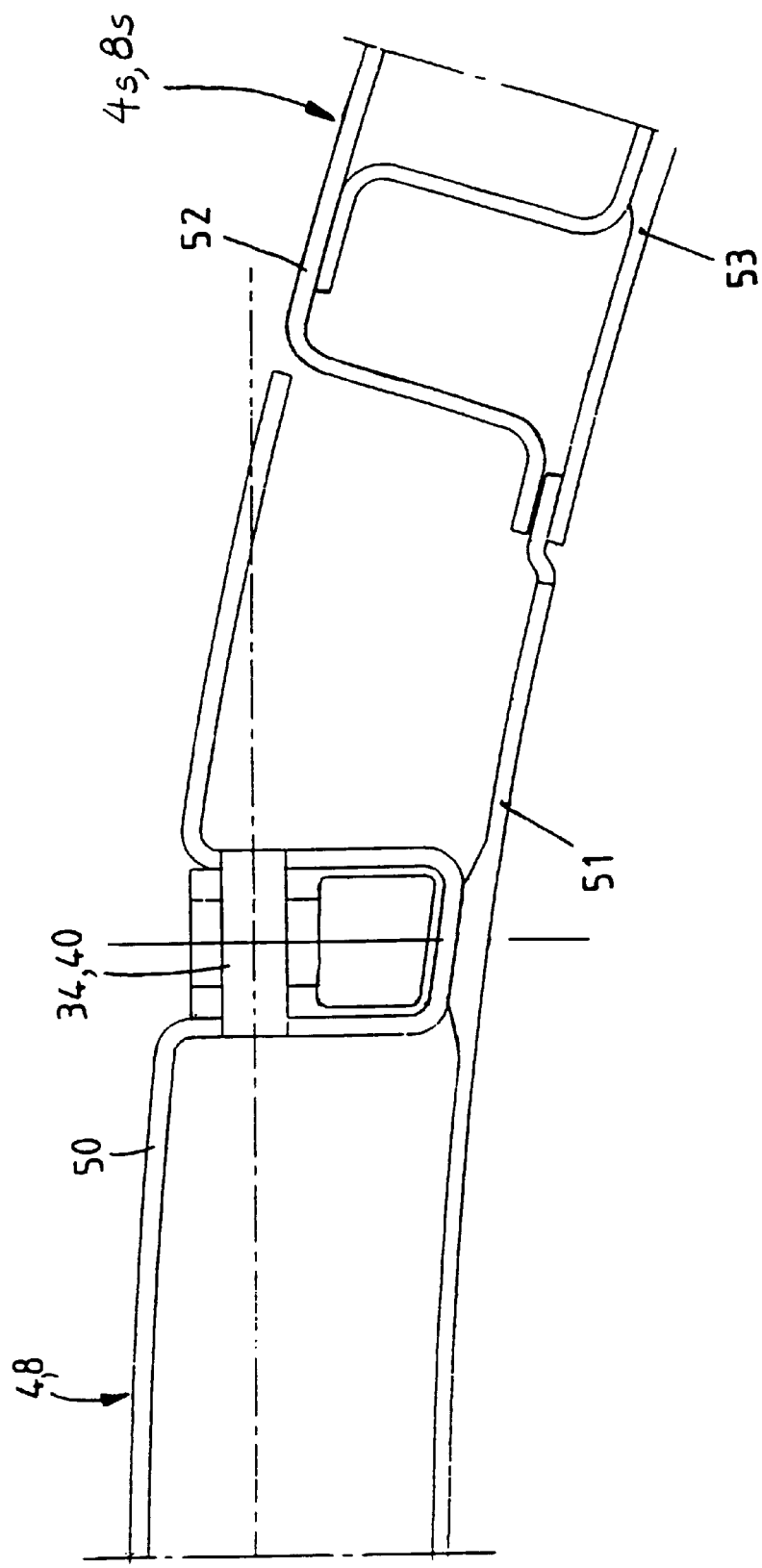
FIG. 9 is a cross-section view showing the geometry of the driven flaps and the follower flaps.

As shown in FIG. 9, each driven flap 4 or 8 comprises a structural segment 50, supporting the hinge shafts 40 or 34, and a base 51. The bases 51 must withstand the stresses caused by the nozzle's internal pressure. The follower flaps 4s or 8s comprise segments 52 and bases 53 which assure sealing in both directions. Since the follower flaps 8s are part of the secondary nozzle, they are free of pressure-differential inversion and, therefore, may consist of a single only bases 53.

The kinematics and the drive system of the primary and secondary nozzles allow greater compactness and implement smaller pressure drops.

The eyelids 16, 17 constitute the third nozzle 15 situated immediately downstream of the fairing 11 and constitute thrust-reversing baffles during landing. The eyelids 16, 17 are mounted on the fairing 11 in such a way that they may pivot about two distinct pivot shafts. One of these shafts permits movement of the two eyelids 16 and 17 into an appropriate position to meet the configurations required for forward thrust. The other shaft controls the configuration of the two eyelids 16, 17 during the thrust-reversal mode.

For that purpose, each eyelid 16 and 17 is affixed to a structure of the fairing 11 by two lateral linkrods 60. The lateral linkrods 60 are mounted in such manner on the fairing 11 that they are freely pivotable about a first transverse shaft 61 which runs parallel to the plane P1. The lateral linkrods 60 are connected to an inner edge of the eyelids 16 and 17 so they may pivot about a second transverse shaft 62 parallel to the first transverse shaft 61. On the other hand, each eyelid 16, 17 is affixed to the fairing 11 by two inner telescoping actuators 63 and by two outer telescoping actuators 64. The actuators 63, 64 are situated one on each side of a plane of symmetry of each eyelid 16, 17. The inner actuators 63 are anchored on the fairing 11 at a point 65 with their rod ends hinging on the respective eyelid 16, 17 at a point 66. The outer actuators 64 are anchored on the fairing 11 at a point 67 with their rod ends hinging on the respective eyelid 16, 17 at a point 68. A hinge shaft defined by the points 66 is closer to the plane P1 than the second transverse shaft 62, whereas a hinge shaft defined by the points 68 is farther away from the plane P1 than the second transverse shaft 62 of the lateral linkrods 60 on the respective eyelids 16, 17.

When the exhaust system is operative, each set of linear actuators 63, 64 alternatively shall be driven according to the motion to be applied to the eyelids 16,17.

In the forward-thrust mode, the outer actuators 64 maintain their length and accordingly only act as (variable-length) linkrods. Accordingly, the combination of the "pseudo-linkrods" 64 and the lateral linkrods 60 constitutes a single-degree of freedom system relative to the structure of the fairing 11. The polygon defined by shafts 67, 68, 62 and 61 is deformable and its deformation determines the displacements of the eyelids 16, 17. Such a displacement is implemented by the inner telescoping linear actuators 63.

Figure 10:
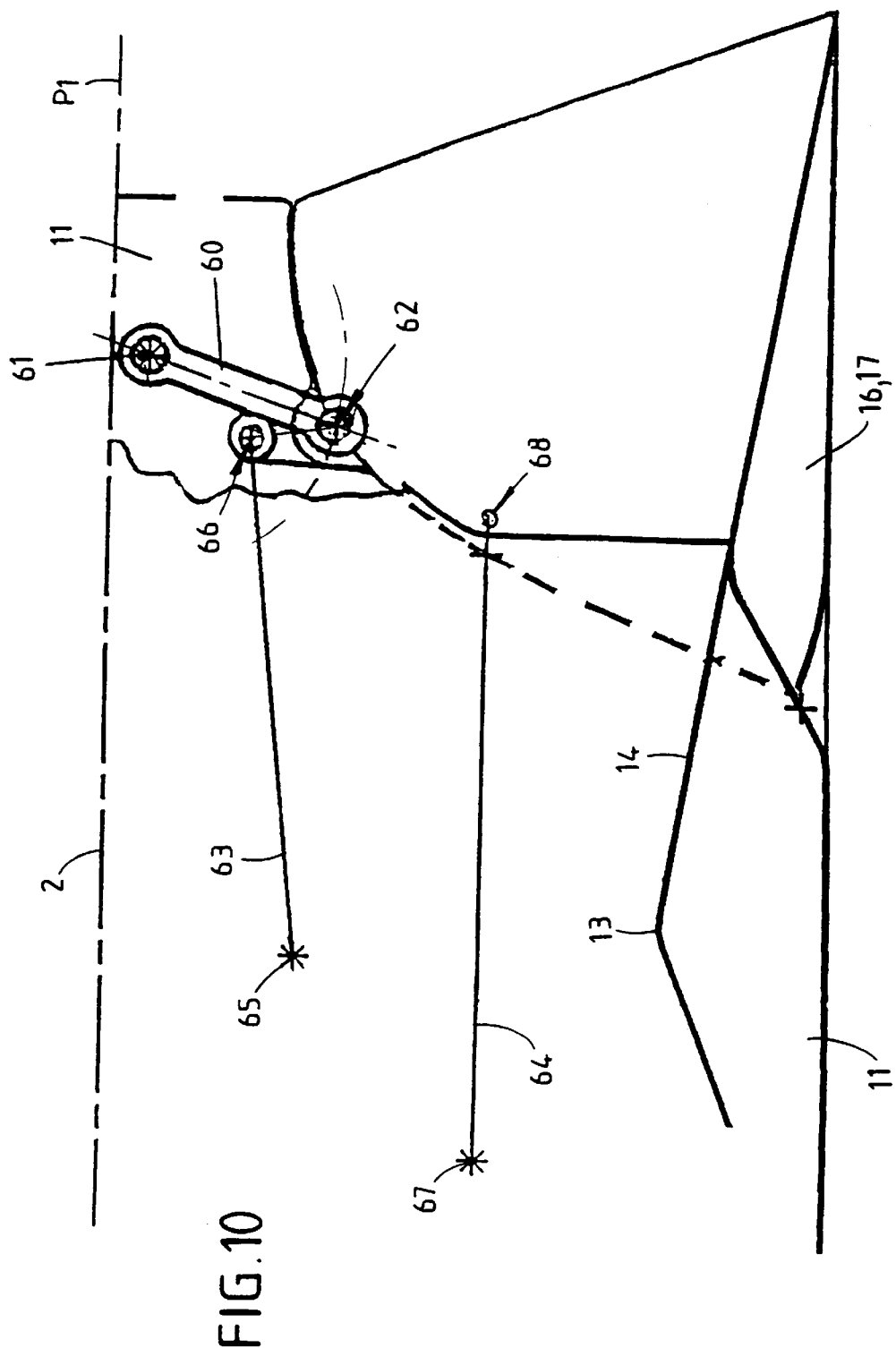
FIG. 10 is a cross-section view showing a detailed control system of the eyelids with the eyelids being in a supersonic-flight mode.
Figure 11:
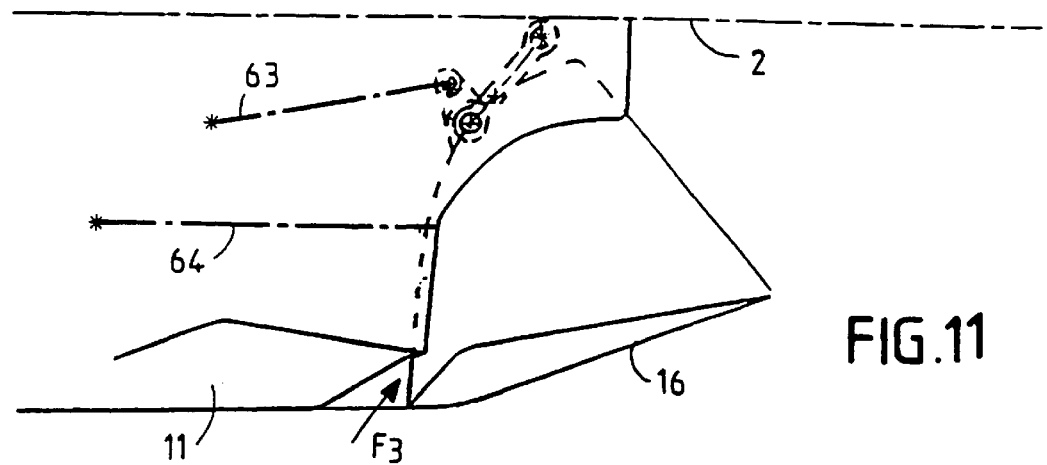
FIG. 11 is a cross-section view showing the eyelids in the takeoff mode.
Figure 12:
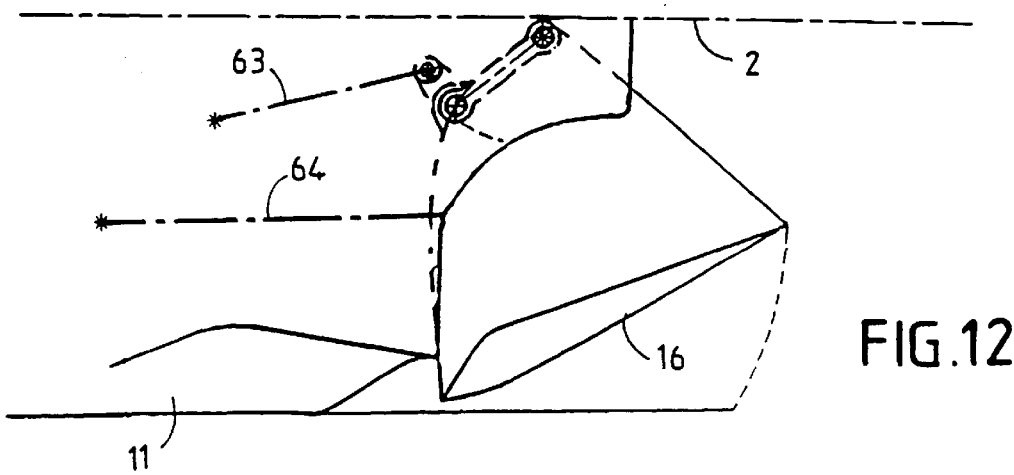
FIG. 12 is a cross-section view showing the eyelids in the sub-sonic mode.

FIGS. 10 through 12 show the angular positions of the eyelids 16,17 in the supersonic mode (M=2), in the takeoff mode, and in the subsonic mode (M=0.95), respectively.

Figure 13:
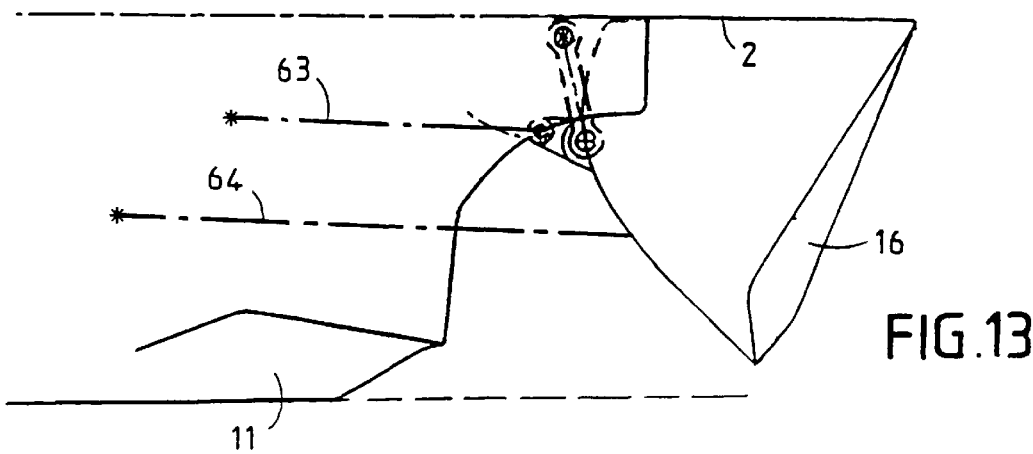
FIG. 13 is a cross-section view showing the eyelids in the thrust-reversal mode.

When in the thrust-reversal mode, the inner linear actuators 63 are kept at fixed lengths, and as a result the rotatability of the lateral linkrods 60 will be restricted. The pivoting motion of the eyelids 16, 17 toward the thrust-reversal position, as shown in FIG. 13, is implemented by the external linear actuators 64. This displacement of the eyelids 16, 17 is very nearly that which is carried out with the Concorde's fixed-pivot system.

On the other hand, when in the forward-thrust mode, the intake of external air F3, the so-called third air, during sub-sonic operation—which in the Concorde depends on the angle of rotation of the eyelids, where this angle in turn depends on the required gas-exhaust cross-section—may be regulated by the dual-control system proposed by the invention regardless of the gas-exhaust cross-section on account of the simultaneous action of the external linear actuators 64 and the inner linear actuators 63.

Moreover, particular configurations may be attained as a function of particular applications by simultaneously driving the inner linear actuators 63 and the external linear actuators 64 in the forward-thrust mode and/or in the thrust-reversal mode.

It should also be noted that the invention offers an additional advantage because of the dual control of the eyelids 16 and 17. In case of control malfunction whereby an eyelid is locked in an undesired position, the dual control allows modifying such a configuration so as to minimize the drawbacks due to the malfunction.

We claim:

1. An exhaust assembly for a jet powerplant of a supersonic airplane, the assembly comprising:

a primary multi-flap nozzle of variable cross-section situated downstream of a primary duct (5), the primary nozzle having a primary exhaust orifice (7) from which a primary gas flow (F1) will be exhausted during operation of the jet powerplant;

a secondary multi-flap nozzle of variable cross-section situated downstream of a secondary duct (9) enclosing the primary duct (5), the secondary nozzle having a secondary exhaust orifice (12) from which a secondary gas flow (F2) will be exhausted during operation so of the jet powerplant, the secondary nozzle extending rearward beyond the primary exhaust orifice (7), the primary gas flow (F1) and the secondary gas flow (F2) comprising a gas jet flowing through the exhaust assembly downstream of the secondary exhaust orifice (12);

a fairing (11) enclosing the secondary duct (9) and fitted with a throat (13) downstream of the exhaust orifice (12) of the secondary nozzle, the throat (13) being followed by a diverging portion (14);

a thrust reverser (15) comprising two eyelids (16, 17) affixed in a pivotable manner to the fairing (11), one on each side of an axial plane of symmetry (P1), the eyelids (16, 17) being movable between an active, thrust-reversal position wherein the eyelids (16, 17) project transversely into the gas jet downstream of the fairing (11) to deflect the gas jet in a forward direction for thrust-reversal and an inactive, forward-thrust position wherein the eyelids (16, 17) are situated in an extension of the fairing (11), the two eyelids (16, 17) each being mounted on the fairing (11) by two lateral linkrods (60) which are freely pivotable relative to the fairing (11) about a transverse axis (61) in the vicinity of the axial plane of symmetry (P1);

at least two inner actuators (63) anchored on the fairing (11), each of the two inner actuators (63) being connected to an inner point (66) on a respective one of the eyelids (16, 17), the inner point (66) being relatively near axial plane of symmetry (P1); and at least two outer actuators (64) anchored on the fairing (11), each of the two outer actuators (64) being connected to an outer point (68) on a respective one of the eyelids (16, 17), the outer point (68) being relatively remote from the axial plane of symmetry (P1);

wherein the two eyelids (16, 17) are retained by the respective inner and outer actuators (63, 64) such that the inner and outer actuators (63, 64) comprise a driving mechanism for the two eyelids (16, 17).

2. An exhaust assembly according to claim 1, wherein the inner actuators (63) are driven to move the eyelids (16, 17) into the forward-thrust position to achieve a forward-thrust mode and the outer actuators (64) are driven to move the eyelids (16, 17) into the thrust-reversal position in a reverse-thrust mode.

3. An exhaust assembly according to claim 1, wherein each eyelid (16, 17) is retained by two inner actuators (63) which are synchronized and situated with one on each side of an axial plane of symmetry of the respective eyelid (16, 17).

4. An exhaust assembly according to claim 1, wherein each eyelid (16, 17) is retained by two outer actuators (64) which are synchronized and situated with one on each side of an axial plane of symmetry of the respective eyelid (16, 17).

5. An exhaust assembly according to claim 1, wherein the outer actuators (64) are of a substantially fixed length when the eyelids are operating in the forward thrust position.

6. An exhaust assembly according to claim 1, wherein the fairing (11) comprises a surface of revolution about a longitudinal axis (2) of the primary duct (5).

7. An exhaust assembly according to claim 1, wherein the primary nozzle comprises a plurality of driven hot flaps (4) alternating with a plurality of hot follower flaps (4s) and the secondary nozzle comprises a plurality of driven cold flaps (8) alternating with a plurality of cold follower flaps (8s), further comprising:

an axially displaceable control ring (31) arranged around the cold flaps (8);

a plurality of levers (36) having a first end, a second end and a middle portion, the first end hinging on the control ring (31), the middle portion hinging on the driven cold flaps (8) and the second ends being pivotably connected to the driven hot flaps (4) by a plurality of linkrods (41) such that the control ring (31), the levers (36) and the linkrods (41) comprise a drive system for the hot flaps and the cold flaps.

8. An exhaust assembly according to claim 2, wherein the outer actuators (64) are of a substantially fixed length when the eyelids are operating in the forward-thrust mode.

* * * * *

UNITED STATES PATENT AND TRADEMARK OFFICE
CERTIFICATE OF CORRECTION

PATENT NO.   : 6,185,926 B1
DATED        : February 13, 2001
INVENTOR(S)  : AH-FA et al.

It is certified that error appears in the above-identified patent and that said Letters Patent is hereby corrected as shown below:

<u>Title page,</u>
Item [57], ABSTRACT,
Line 12, delete "to".

<u>Column 2,</u>
Line 44, should read -- system of the flaps of the primary and secondary nozzles; --.

<u>Column 5,</u>
Line 55, delete "so".

Signed and Sealed this

Twenty-ninth Day of October, 2002

*Attest:*

JAMES E. ROGAN
*Attesting Officer*        *Director of the United States Patent and Trademark Office*